UNITED STATES PATENT OFFICE.

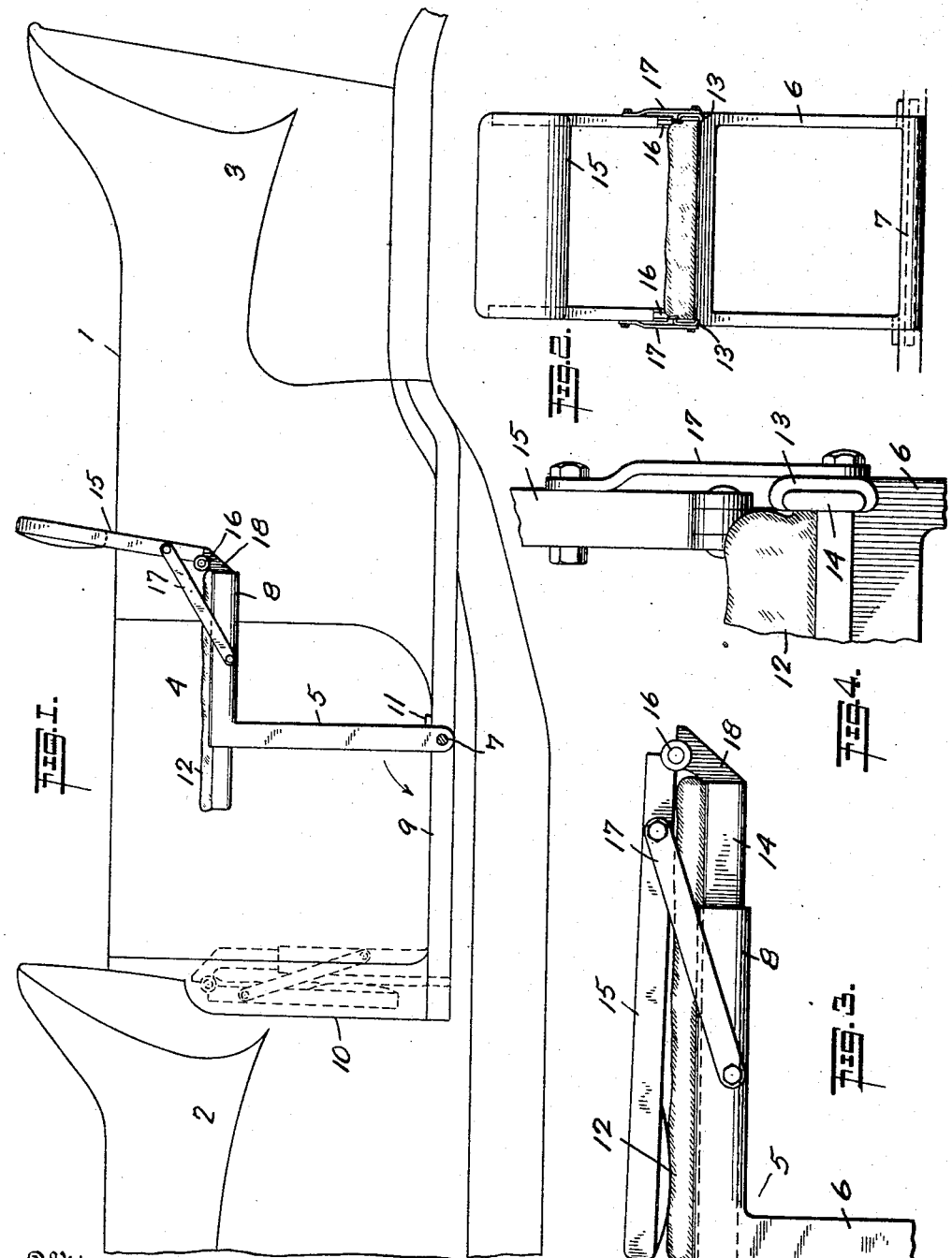

HENRY MIDDLEBROOK CRANE, OF NEW YORK, N. Y., ASSIGNOR TO SIMPLEX AUTOMOBILE COMPANY, INC., OF NEW BRUNSWICK, NEW JERSEY, A CORPORATION OF DELAWARE.

AUTOMOBILE-SEAT.

1,206,208.  Specification of Letters Patent.  Patented Nov. 28, 1916.

Application filed August 13, 1915. Serial No. 45,301.

*To all whom it may concern:*

Be it known that I, HENRY MIDDLEBROOK CRANE, a citizen of the United States, residing in the city, county, and State of New York, have invented certain new and useful Improvements in Automobile-Seats, of which the following is a specification.

The invention relates to automobile bodies having front and rear seats, and in addition thereto intermediate seats mounted on frames hinged so as to fold forwardly and downwardly into the floor of the car and into the back of the seats in front.

The old style folding seat, while allowing ample leg room for the person occupying the same, leaves insufficient room for those on the rear seat. This is due to the fact that the position which the seat is to occupy when folded requires the frame thereof to be placed at a definite distance rearward from the front seat (such distance being approximately equal to the height of the seat), and from this it resulted that the back of the folding seat was necessarily too far rearward for the comfort of persons behind.

By the present invention this difficulty is overcome by a construction which permits the folding seats to be spaced as desired between the front and rear seats, irrespective of the position of the folding frames, thus enabling adequate leg room to be provided for the rear seat occupants without unduly limiting the leg room for those on the folding seats. To this end the seat frame is disposed as heretofore, but the seat proper is capable of forward and rearward movement on the frame, so that it may be set forwardly in overhanging relation when in use, and slid backward in order to permit the folding of the seat in the manner described. Links connected with the hinged back compel the seat to slide rearward on the frame when the back is lowered preparatory to folding.

In the accompanying drawings illustrating the invention: Figure 1 is a side elevation of the folding seat shown in relation to an automobile body, which is represented in a somewhat diagrammatic manner; Fig. 2 is a front elevation of one of the folding seats; Fig. 3 is a fragmentary enlarged side elevation of the same, showing the back folded down preparatory to the turning of the structure into the folded position indicated by dotted lines in Fig. 1; and Fig. 4 is a fragmentary front elevation, on a still larger scale, illustrating a portion of the folding seat.

The car's body, designated 1, is provided with front and rear seats 2 and 3, which may be of usual or suitable character. One of the intermediate seats is designated 4. It will be understood that there are two of these seats.

Each of the folding seats comprises a frame 5, substantially of inverted L-shape. The frame part 6 constituting the vertical member of the L rises from the floor of the car, to which it is hinged at its lower end, as indicated at 7. The rearwardly projecting top portion 8 of the frame constitutes the seat-receiving part, and because of the nature of the improvement need not extend as far rearward as has been customary in such folding seats. The parts 6 and 8 of the frame being rigid with each other, forward turning of the frame about the hinge pivot 7 brings the same into the position shown in dotted lines in Fig. 1, where the frame part 6 is horizontal, being received in recesses 9 in the floor, while the part 8 stands vertically in rear of the recess 10 at the back of the front seat 2. Rearward movement of the frame beyond its erected position may be prevented by customary stops 11.

The rearwardly projecting top part 8 of the frame is constructed so as to permit the seat proper 12 to slide therein. To this end it is shown as being composed of channeled guides 13, in which side bars 14 of the seat proper are slidably guided and retained. When in use the seat proper is disposed in the forwardly overhanging relation shown in Fig. 1, the position selected being such as to effect the most desirable division of the leg room space.

The back 15 is hinged at 16 to the rear end of the seat, so as to be capable of folding downward over the seat in the manner shown in Fig. 3. Links 17 are pivoted at their opposite ends to the back and to the frame bars 13, with the result that when the back is lowered the seat proper 12 is drawn rearward into the position shown in Fig. 3, so that the seat and back will properly enter the recess 10 provided in the back of the front seat when the frame is turned forward. When the seat is in use, forward sliding of the seat proper is prevented by the hinged portions 18, which bear against the rear ends of the guides 13 after the manner of stops. Rearward sliding of the seat proper is, of course, prevented under the conditions of use by the pressure of the occupant's back upon the back 15; and the links 17, in addition to their function of coordinating the movements of the back and seat, serve as braces removing the strain on the hinge 16.

What I claim as new is:

1. In an automobile, and in combination with the car body having front and rear seats, an intermediate folding seat comprising a standard part normally rising from the bottom of the body and hinged at its lower end so as to fold downwardly and forwardly, a seat-receiving part rigid with and extending rearward from said standard part, a seat mounted slidably in said seat-receiving part and when in use projecting forwardly from the same, a back hinged to the seat so as to fold forwardly thereover, and one or more links connecting the back with the seat-receiving portion so as to compel the seat to slide rearwardly when the back is lowered.

2. An intermediate folding automobile seat comprising a frame rising from the bottom of the car body with a rearwardly projecting top portion and hinged at its lower end so as to fold forwardly and downwardly, a seat slidable on the rearwardly projecting top portion of said frame, a back hinged so as to fold downward over the seat, and linkage connecting the back with the hinged frame for compelling said seat to slide rearward when the back is lowered.

3. A folding automobile seat comprising a frame substantially of inverted L-shape, hinged at its lower end so as to fold forwardly, a seat slidably mounted on the rearwardly projecting top portion of the frame and capable of sliding forwardly and rearwardly with relation thereto, a back hinged to the seat so as to fold downwardly upon the seat, and connections between the back and seat for automatically effecting the sliding of the seat upon the frame.

4. In an automobile, and in combination with the car body having front and rear seats, an intermediate seat adapted to fold into the floor of the car and into the back of the seat in front, said intermediate seat comprising a frame substantially of inverted L-shape hinged at its lower end so as to fold forwardly, a seat slidable on the rearwardly projecting top portion of said frame and when in use overhanging the front of the same, a back hinged to the seat so as to be capable of folding down thereover, one or more links connecting the back with the top portion of the frame so as to compel the seat to slide rearwardly when the back is lowered, and a stop limiting the forward movement of the seat on the frame.

5. In an automobile, and in combination with the car body having front and rear seats, an intermediate folding seat comprising a frame part rising from the bottom of the body and hinged at its lower end so as to fold downward in it, a seat mounted slidably upon said frame, a back hinged to the seat so as to fold forwardly thereover and connections between the said back and the frame for the seat so as to compel the seat to slide when the back is lowered.

6. In an automobile, and in combination with the car body having front and rear seats, an intermediate folding seat comprising a frame part rising from the bottom of the body and hinged at its lower end so as to fold downward in it, a seat mounted slidably upon said frame and when in use projecting forwardly over the same, guides carried by said frame for said seat, a back hinged to the seat so as to fold forwardly thereover and connections between the said back and the frame for the seat so as to compel the seat to slide when the back is lowered.

7. In an automobile, and in combination with the car body, having front and rear seats, an intermediate folding seat comprising a part rising from the bottom of the body and hinged at its lower end so as to fold downwardly and forwardly, a slidable seat mounted on said seat frame and when in use projecting forwardly from the same, a back hinged so as to fold forwardly over the seat, and connections between the back and seat for automatically effecting the sliding of the seat upon the frame, the relation of the parts being such that with the seat in its forward position, proper space is afforded between the same and the seat in front for the occupant of the intermediate seat.

8. In an automobile, and in combination with the car body having a front seat, a folding seat in back of said front seat comprising a frame part rising from the bottom of the body and hinged at its lower end so as to fold downwardly and forwardly, a seat-receiving part rigid with and extending rearward from said frame part, a seat mounted slidably in said seat receiving part, a back hinged to the seat so as to fold forwardly thereover, and one or more links connecting the back with the seat-receiving portion so as to compel the seat to slide rearwardly when the back is lowered.

9. In an automobile, and in combination with the car body having a front seat, a folding seat in back of said front seat comprising a frame part rising from the bottom of the body and hinged at its lower end so as to fold downwardly and forwardly, a slidable seat mounted on said seat frame and when in use projecting forwardly from the same, a back hinged to the seat so as to fold forwardly thereover, and linkage connecting the back and seat frame so as to compel rearward movement of the seat when the back is folded.

In testimony whereof, I have signed my name to this specification, in the presence of two subscribing witnesses.

HENRY MIDDLEBROOK CRANE.

Witnesses:
HENRY LOCKHART,
J. HOWARD BREESE.

Copies of this patent may be obtained for five cents each, by addressing the "Commissioner of Patents, Washington, D. C."